United States Patent [19]

Husson, Jr.

[11] Patent Number: 4,660,544

[45] Date of Patent: * Apr. 28, 1987

[54] SOLAR COLLECTOR SYSTEM WITH RADIATION CONCENTRATED ON HEAT ABSORBER VANES

[76] Inventor: Frank D. Husson, Jr., 10414 Woodchuck Point, San Diego, Calif. 92131

[*] Notice: The portion of the term of this patent subsequent to Dec. 13, 2000 has been disclaimed.

[21] Appl. No.: 750,297

[22] Filed: Jul. 1, 1985

Related U.S. Application Data

[60] Continuation-in-part of Ser. No. 559,753, Dec. 9, 1983, abandoned, which is a division of Ser. No. 297,228, Aug. 28, 1981, Pat. No. 4,420,375.

[51] Int. Cl.$^4$ .............................. B01D 1/00; F24J 3/02
[52] U.S. Cl. .................................. 126/440; 126/441; 126/449; 202/234; 203/DIG. 1
[58] Field of Search ............... 126/433, 434, 440, 441, 126/449, 450, 901; 202/234; 203/DIG. 1

[56] References Cited

U.S. PATENT DOCUMENTS

| | | | |
|---|---|---|---|
| 102,633 | 5/1870 | Wheeler et al. | 126/433 |
| 3,655,517 | 4/1972 | Hensley et al. | 202/234 |
| 4,227,970 | 10/1980 | Howell et al. | 202/234 |
| 4,235,679 | 11/1980 | Swaidan | 202/234 |
| 4,270,981 | 6/1981 | Stark | 126/440 X |
| 4,292,136 | 9/1981 | Clavier | 202/234 |
| 4,420,375 | 12/1983 | Husson | 202/234 |

*Primary Examiner*—Margaret A. Focarino
*Attorney, Agent, or Firm*—Baker, Maxham & Jester

[57] ABSTRACT

A rectangular frame contains a plurality of upwardly opening trays each having a heat absorber element with a plurality of upstanding vanes. A lens associated with each tray concentrates incident solar radiation on the vanes to preferentially heat a portion of the liquid filling the tray to a relatively high temperature at which vaporization is more efficiently accomplished than in prior solar stills. The evaporated liquid is condensed on an overlying surface and is collected for later use. The system may be used in distilling water and in solar refrigeration.

11 Claims, 2 Drawing Figures

SOLAR COLLECTOR SYSTEM WITH RADIATION CONCENTRATED ON HEAT ABSORBER VANES

CROSS-REFERENCE TO RELATED APPLICATIONS

This application is a continuation-in-part of my U.S. patent application Ser. No. 559,753 filed Dec. 9, 1983 and entitled "Solar Still" which is now abandoned. Application Ser. No. 559,753 was in turn a divisional application based on my U.S. patent application Ser. No. 297,228 filed Aug. 28, 1981 and also entitled "Solar Still". Application Ser. No. 297,228 has issued as U.S. Pat. No. 4,420,375 granted Dec. 13, 1983.

BACKGROUND OF THE INVENTION

The present application relates to solar energy collector systems, and more particularly, to such a system that has significantly improved heat transfer capabilities for use in solar applications requiring high temperatures, such as systems designed to vaporize water or other liquids. In such systems it is necessary to generate relatively high temperatures such as 185 degrees F. and higher. Most solar energy collector systems are designed to heat a large volume of water for household use or for swimming pools, and they are not designed to vaporize the water.

SUMMARY OF THE INVENTION

It is therefore the primary object of the present invention to provide an improved solar collector system.

Another object of the present invention is to provide a solar collector system in which incident solar radiation is concentrated on heat absorber elements to preferentially heat a portion of a quantity of liquid to a relatively high temperature.

Another object of the present invention is to provide a solar collector system for vaporizing a liquid over a more efficient segment of the vapor pressure curve.

Another object of the present invention is to provide an improved solar water distillation system.

Another object of the present invention is to provide a solar refrigeration system.

Another object of the present invention to provide an improved solar collector system for high efficiency vaporization of a liquid that is readily fabricated from durable materials.

In accordance with the present invention a rectangular frame contains a plurality of upwardly opening trays each having a heat absorber element with a plurality of upstanding vanes. A lens associated with each tray concentrates incident solar radiation on the vanes to preferentially heat a portion of the liquid filling the tray to a relatively high temperature at which vaporization is more efficiently accomplished than in prior solar stills. The evaporated liquid is condensed on an overlying surface and is collected for later use. The system may be used in distilling water and in solar refrigeration.

DESCRIPTION OF THE PREFERRED EMBODIMENTS

The entire disclosure of my U.S. Pat. No. 4,420,375 granted Dec. 13, 1983 and entitled SOLAR STILL is specifically incorporated herein by reference.

Figure 1:
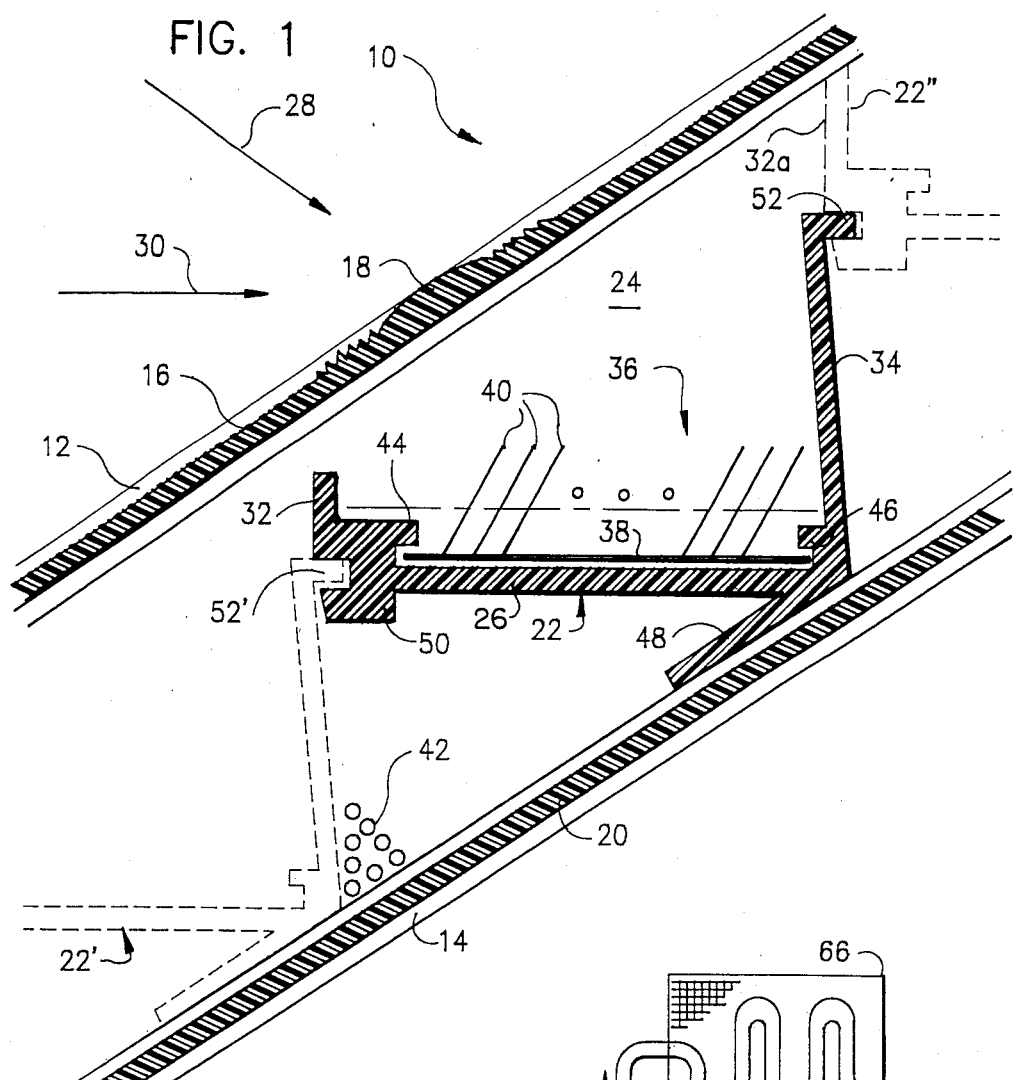
FIG. 1 is a fragmentary vertical section view of a portion of a solar collector constructed in accordance with my invention.

FIG. 1 illustrates the construction of a first embodiment 10 of my solar collector system adapted for distilling saline, brackish or otherwise hazardous or unpleasant tasting water. The system includes a rectangular hollow frame (not illustrated) having vertical sidewalls formed with upper and lower flanges or other longitudinal channel defining means 12 and 14 for slidably receiving the longitudinal side edges of upper and lower panels 16 and 18. End walls of the frame (not illustrated) engage the transverse end edges of the panels. The panel 16 is preferrably made of transparent plastic or some other suitable transparent material in which a plurality of longitudinally spaced, transversely extending Fresnel lenses such as 18 may be readily formed. The lower panel 20 serves as a bottom closure and heat barrier. It need not be transparent and may be made of plastic or other suitable material.

A plurality of transversely extending, upwardly opening elongate trays such as 22 are mounted within the interior 24 of the frame each beneath a corresponding one of the Fresnel lenses 18. Each tray has a U-shaped cross-section and is mounted between the upper and lower panels 16 and 18 at an angle with respect thereto so that the bottom wall 26 thereof extends horizontally when the collector frame is inclined toward the sun. As the sun travels across the sky the incidence angle of the solar radiation varies from relatively high (arrow 28) to relatively low (arrow 30). The Fresnel lens concentrates and focuses the incident solar radiation into a narrow, transversely extending band which moves longitudially (left to right in FIG. 1) between a forward wall 32 and a rearward wall 34 of the tray 22.

Each tray 22 has an elongate, transversely extending heat absorber element 36 mounted therein including a horizontal bottom plate 38 and a plurality of transversely extending, parallel vanes 40 which are connected to and project upwardly from the plate 38. The elements 36 are similar to an upside down comb in cross-section, with teeth raked back at an angle relative to the bottom plate 38. The blades are raked back at an angle so as to prevent any incident radiation from impinging directly on the bottom plate. The heat absorber element is preferably extruded from opaque black plastic with a matte or non-reflective finish to maximize the capture of solar radiation in the blades.

Each of the trays 22 are filled with water. The vanes 40 of each heat absorbing element 36 extend above the front wall 32 so that they are only partially immersed in the water. Excess water trickles down from tray to tray over the front walls thereof to ensure that the upper ends of the blades are never completely immersed. The spacing between the blades and the thickness thereof is selected so that the water will creep up the sides of the blades as a result of capillary action, surface tension or some other phenomenon which is not entirely understood but nevertheless predictably occurs if the geometry of the heat absorbing elements is optimized. By way of example, the vanes 40 may be approximately one-quarter to one inch in height. The blades are made as thin as possible without inhibiting their ability to stand up to the heat. By way of example, the blades may be approximately 0.15 inches thick. The vanes prevent sunlight from reaching the bottom plate 38 of the heat absorber element or the bottom wall 26 of the tray. This minimizes the amount of heat which is re-radiated off the back side of the solar collector. Thermal insulation 42 between the bottom wall 26 of each tray and the bottom panel 20 of the collector further minimizes heat loss.

The Fresnel lens 18 not only serves to concentrate the solar radiation on the vanes 40, but in addition it performs this function with a short focal length, for example one to three inches, so that the solar collector can have a relatively small vertical dimension. The incident solar radiation is focused into a relatively narrow band, for example across two or three vanes at any one time, making it possible to preferentially heat a portion of the quantity of water in the tray to temperatures of 185 degrees F. and higher. Thus the water is heated to a range of the temperature versus vapor pressure curve that is much more efficient in terms of the rate at which the water is evaporated than if a larger volume of water were heated to a lower temperature. The individual vanes absorb heat and transfer it on both sides to the minute amount of water adjacent thereto.

The water vapor condenses on the underside of the upper panel 16 and flows down the smooth surface thereof to collection means at the lowermost end of the frame as taught in my aforementioned U.S. Pat. No. 4,420,375. My collector described herein may also have automatic valve means as taught in my aforementioned patent for introducing water to be distilled at the uppermost end of the frame, which spills down successively into each of the parallel distillate trays.

Referring still to FIG. 1, each extruded tray 36 is sized to fit between the upper and lower panels 16 and 20 so that its bottom wall 26 will be at an angle of, for example, thirty-five degrees relative to the panels. The extruded tray is formed with transverse flanges 44 and 46 extending from the forward and rearward walls 32 and 34, respectively, under which the bottom plate 38 of the heat absorber element is slid. An angled cleat 48 extends downward from the bottom wall of the tray and engages the lower panel 20 to support the tray thereon. A forward interlock element 50 on the front edge of the bottom wall 26 of the tray engages a rear interlock 52' on the rearward wall of the identical tray 22' immediately in front.

Each tray is preferably made of extruded opaque white plastic. Thus rearward wall 34 of the tray and its adjoining forward wall 32a of the following tray 22" form reflecting surfaces directing the solar radiation into the heat absorber element. This becomes progressively more important as the incident angle of the radiation goes from relatively high (arrow 28) to relatively low (arrow 30).

Table I set forth hereafter verifies the improved performance that a Fresnel lens equipped solar distiller as desribed above achieved over a similar solar distiller with an upper panel of ordinary flat glass in a comparative test experiment conducted over a sixteen day period.

TABLE I

| Day | Yield Without Lens | Yield With Lens |
| --- | --- | --- |
| 1 | 20.5 ounces | 23.0 ounces |
| 2 | 21.0 ounces | 24.0 ounces |
| 3 | 20.0 ounces | 23.0 ounces |
| 4 | 19.0 ounces | 22.5 ounces |
| 5 | 20.0 ounces | 24.0 ounces |
| 6 | 18.5 ounces | 20.0 ounces |
| 7 | 21.0 ounces | 24.5 ounces |
| 8 | 18.0 ounces | 19.0 ounces |
| 9 | 21.0 ounces | 24.0 ounces |
| 10 | 20.5 ounces | 24.0 ounces |
| 11 | 18.5 ounces | 19.5 ounces |
| 12 | 19.0 ounces | 19.5 ounces |
| 13 | 20.5 ounces | 23.5 ounces |
| 14 | 21.5 ounces | 25.0 ounces |
| 15 | 21.0 ounces | 24.0 ounces |
| 16 | 20.5 ounces | 24.0 ounces |

The Fresnel lens used in the above experiment was crude, but improved performance was still achieved. Much better performance can be achieved by optimizing the components in the system, particularly the lens.

Figure 2:
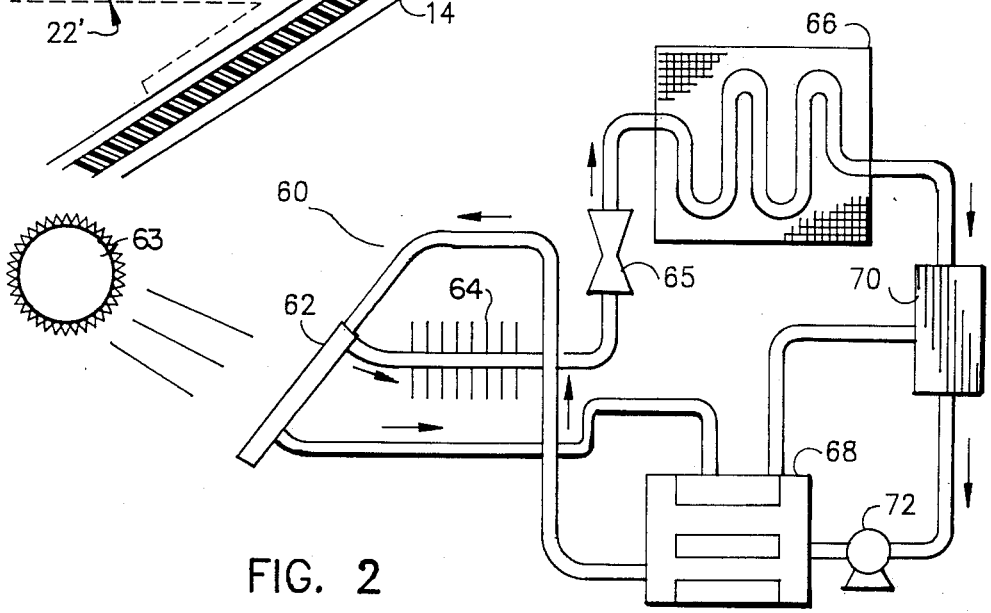
FIG. 2 is a schematic illustration of a solar refrigeration system constructed in accordance with my invention.

FIG. 2 illustrates a second embodiment 60 of my invention which operates as a solar powered refrigeration system based on the absorption cycle, thereby not requiring a compressor. A solar collector panel 62 having the general construction of that just described is used as a boiler or generator to heat water containing a high concentration of dissolved ammonia. The solar panel is made of metal and glass components which are not subject to deterioration when exposed to ammonia. When the liquid in the solar collector panel is heated, the ammonia is driven off as vapor and the water remains behind. As this ammonia evaporation continues, the pressure rises until it is high enough to condense in a condenser 64. The condensed liquid ammonia is then expanded by means of a special valve 65 and thereupon evaporates again, in the evaporator plate 66 causing the same to be cooled and absorb heat from the surroundings. The water which remains behind in the solar collector panel 62 trickles down after most of the ammonia has been driven off is passed, while it is still very hot, through a heat exchanger 68 in which it gives off some of its heat. The cooled water then goes to an absorber 70 where it re-absorbs and becomes saturated with the pure ammonia vapor coming from the evaporator 66. The water/ammonia solution formed in this way is conveyed by a pump 72 through the heat exchanger 68, where it absorbs heat from the hot water flowing from the solar collector panel 62. The water/ammonia solution is then returned to the top of the solar collector panel 62. The cycle of events then starts all over again.

Having described preferred embodiments of my invention modifications and adaptations thereof will occur to those skilled in the art. For example, the means for concentration the solar radiation may be a convex lens, a system of mirrors or some other means. Therefore, the protection afforded my invention should only be limited in accordance with the scope of the following claims.

I claim:

1. A solar collector system, comprising:
   a frame;
   a plurality of elongate trays mounted within the frame, each tray opening in an upward direction for holding a quantity of a liquid therein;
   an elongate heat absorber element mounted in each tray including spaced apart, upwardly extending parallel vanes;
   lens means mounted to the frame for concentrating incident solar radiation on the vanes for evaporating the liquid in each tray; and means for collecting liquid which condenses in the housing after evaporation from the trays.

2. A system according to claim 1 wherein the lens means includes a plurality of Fresnel lenses each for concentrating incedent solar radiation on the vanes of a corresponding heat absorber element.

3. A system according to claim 1 and further comprising means for thermally insulating the frame to minimize the heat loss therefrom.

4. A system according to claim 1 wherein each heat absorber element comprises an extruded piece of black plastic material having a non-reflective finish.

5. A system according to claim 1 wherein the vanes of each heat absorber element are spaced closely enough together so that liquid from the corresponding tray will be drawn upwardly along the vanes.

6. A system according to claim 5 wherein the vanes of each heat absorber element are approximately 0.25 inches tall and 0.015 inches thick.

7. A system according to claim 1 wherein each heat absorber element includes a bottom plate connected to a set of lower ends of the vanes, the bottom plate resting on a bottom wall of the corresponding tray.

8. A system according to claim 1 wherein the lens means concentrates incident solar radiation along an elongate band which is only a portion of the width of the vanes of each heat absorber element.

9. A system according to claim 1 wherein each tray is white in color.

10. A system according to claim 1 wherein the trays interlock with each other.

11. A solar collector system, comprising:
an upwardly opening tray for holding a quantity of a liquid:
a heat absorber element mounted in the tray including a plurality of upwardly extending vanes:
a lens for concentrating incident solar radiation on the heat absorber means;
means for providing a surface on which liquid evaporated from the tray will condense; and
means for collecting the condensed liquid.

* * * * *